US006968512B2

(12) United States Patent
Duxbury

(10) Patent No.: US 6,968,512 B2
(45) Date of Patent: Nov. 22, 2005

(54) ELECTRONIC CONTENT STORAGE

(75) Inventor: Paul Duxbury, Sandbach (GB)

(73) Assignee: Fujitsu Services Limited, Slough (GB)

(*) Notice: Subject to any disclaimer, the term of this patent is extended or adjusted under 35 U.S.C. 154(b) by 826 days.

(21) Appl. No.: 09/803,086

(22) Filed: Mar. 8, 2001

(65) Prior Publication Data
US 2001/0032253 A1 Oct. 18, 2001

(30) Foreign Application Priority Data
Apr. 13, 2000 (GB) .................................. 0008999

(51) Int. Cl.[7] ............................................... G06F 3/00
(52) U.S. Cl. ..................... 715/847; 715/760; 715/513; 715/530
(58) Field of Search ............................. 707/104, 102, 707/104.1, 103 R, 103, 1; 345/719; 715/760, 715/719, 854, 847, 853, 731, 732, 764, 513, 715/530, 501.1

(56) References Cited

U.S. PATENT DOCUMENTS

| 6,102,287 A * | 8/2000 | Matyas, Jr. ................. 235/380 |
| 6,209,036 B1 * | 3/2001 | Aldred et al. ............... 709/229 |
| 6,275,829 B1 * | 8/2001 | Angiulo et al. ........... 707/104.1 |
| 6,373,502 B1 * | 4/2002 | Nielsen ...................... 345/708 |
| 6,405,221 B1 * | 6/2002 | Levine et al. ............ 715/501.1 |
| 6,529,910 B1 * | 3/2003 | Fleskes ................... 707/102 X |

FOREIGN PATENT DOCUMENTS

GB    2 328 300    2/1999

* cited by examiner

Primary Examiner—Raymond J. Bayerl
(74) Attorney, Agent, or Firm—Barnes & Thornburg

(57) ABSTRACT

In a method for storing and accessing electronic content (e.g. for a Website), content objects are stored in a structured manner in a content store. Some of the content objects in the content store are identified as shortcuts, pointing to other objects in the content store. When a shortcut is accessed, the target object pointed to by that shortcut is automatically accessed from the content store and returned in place of the shortcut object. This provides a powerful way of structuring websites and other forms of content delivery.

6 Claims, 5 Drawing Sheets

ELECTRONIC CONTENT STORAGE

BACKGROUND TO THE INVENTION

This invention relates to electronic content storage techniques. The invention is particularly although not exclusively concerned with content storage for use in generating websites.

By content is meant any information or goods that are delivered electronically to a consumer, either directly or indirectly. For example, content may be embodied in HTML pages and their associated images, and delivered directly to users through the World Wide Web. However, the advent of more general eBusiness (electronic business) applications has led to a corresponding generalisation in the definition of content to include, for example:

Web pages and images.
  Multimedia files (e.g. audio & video clips).
  Streaming media.
  Shopping catalogues.
  "Soft" or "digital" goods for sale (e.g. downloadable music and software).
  Functionality, as embodied in CGI scripts and their modern equivalents.

Such content is generally held in some form of content store. For example, in a conventional website, the content store may be an ordinary filestore containing prepared HTML pages. Alternatively, in a dynamic website, the content store may be a relational database holding raw data, and publishing may use some dynamic page construction mechanism such as CGI or ASP, or a template rendering mechanism, to construct web pages when required.

A problem with known electronic content storage techniques is that they do not provide any assistance with creating and maintaining complex content structures, such as may be required for example in creating a group of interlinked websites, a group of web pages within a site, or a single complex web page. The object of the present invention is to provide a novel technique for storing and accessing electronic content, which addresses this problem.

SUMMARY OF THE INVENTION

According to the invention, a method for storing and accessing electronic content comprises:

(a) storing content objects in a structured manner in a content store;

(b) identifying some of the content objects in the content store as shortcuts, pointing to other objects in the content store; and (c) when a shortcut is accessed, automatically accessing the target object pointed to by that shortcut from the content store, and returning said target object in place of the shortcut object.

It will be shown that the use of such shortcuts provides a powerful way of structuring websites and other forms of content delivery. In particular, as will be described, it provides the following:

The ability to create multiple concurrent views of the same raw content.
  The ability to model different websites using the same raw content, selected and structured in different ways.
  The ability to model complex pages such as homepages or portals.
  The ability to edit web pages simply by resetting existing shortcuts or adding new ones (using a "paste as shortcut" command), or by changing properties of filters.

DESCRIPTION OF AN EMBODIMENT OF THE INVENTION

One embodiment of the invention will now be described by way of example with reference to the accompanying drawings.

Figure 1:
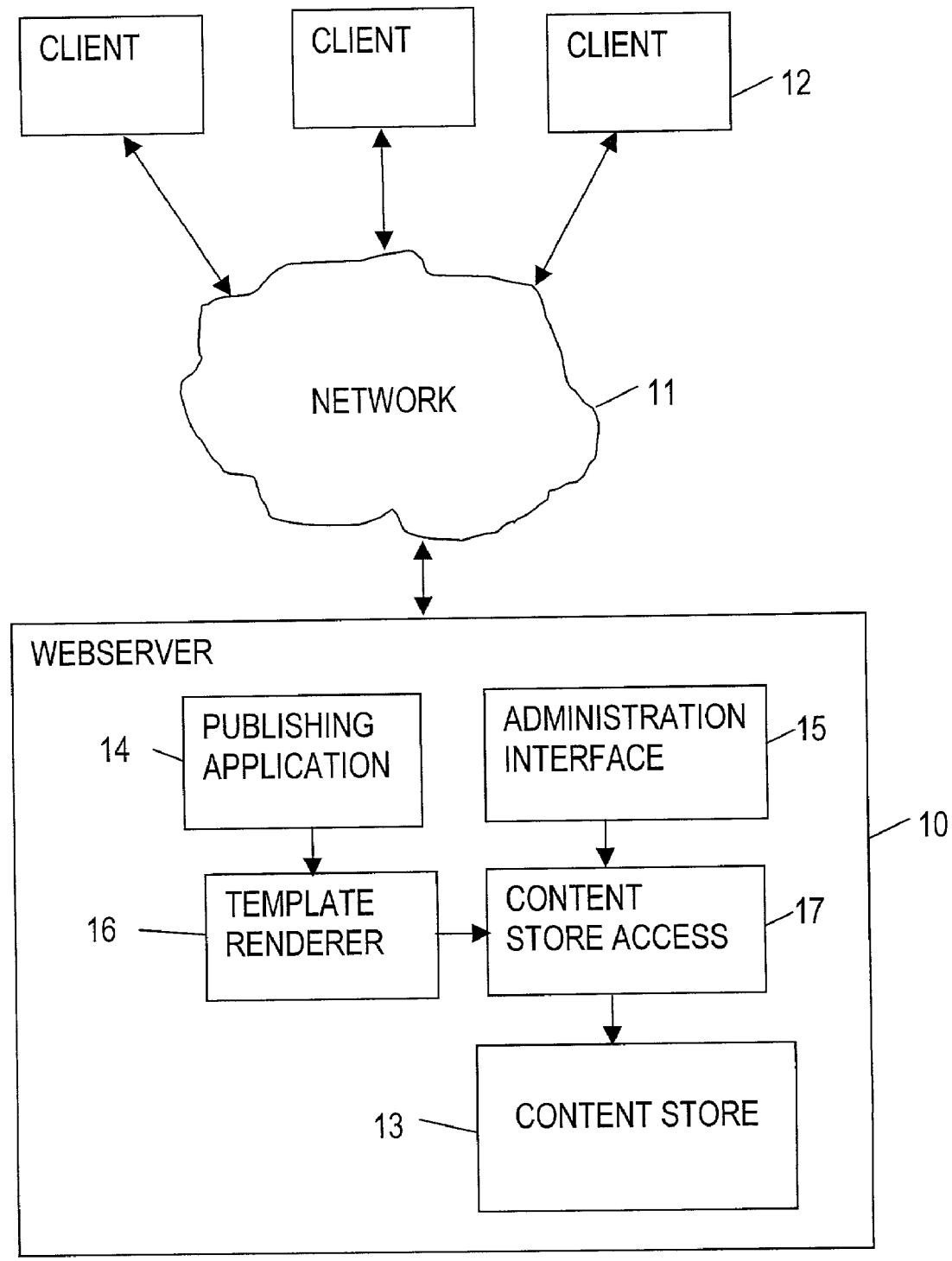
FIG. 1 shows a computer network including a web server computer.

FIG. 1 shows a Web server computer 10, which hosts one or more websites. The Web server 10 can be accessed over a network 11 by a number of client devices 12. Typically, the network 11 may be the Internet or an in-house intranet. Each of the client devices 12 may for example be a personal computer (PC), mobile phone, or interactive TV, and contains conventional browser software for accessing web pages from the web server.

The Web server 10 includes a content store 13, a website publishing application 14, an administration interface 15, a template renderer 16, and a content store access service 17. The components 14–17 may all be implemented as Java servlets.

Content Store

The content store 13 holds all the content for the website. It contains a set of objects, logically organised in a tree structure. Each object represents either an actual item of content (such as a template, dynamic information to be inserted into a template, a partially rendered template, or a fully rendered document), or a folder which may contain other objects. The content store may be distributed, and accessed over a network using the standard WebDAV (Web-based Distributed Authoring and Versioning) protocol, or alternatively may be local. The content store may simultaneously include many distinct implementations of the logical model on different media, such as relational database management systems, filesystems, memory, XML documents, and so on.

Figure 2:
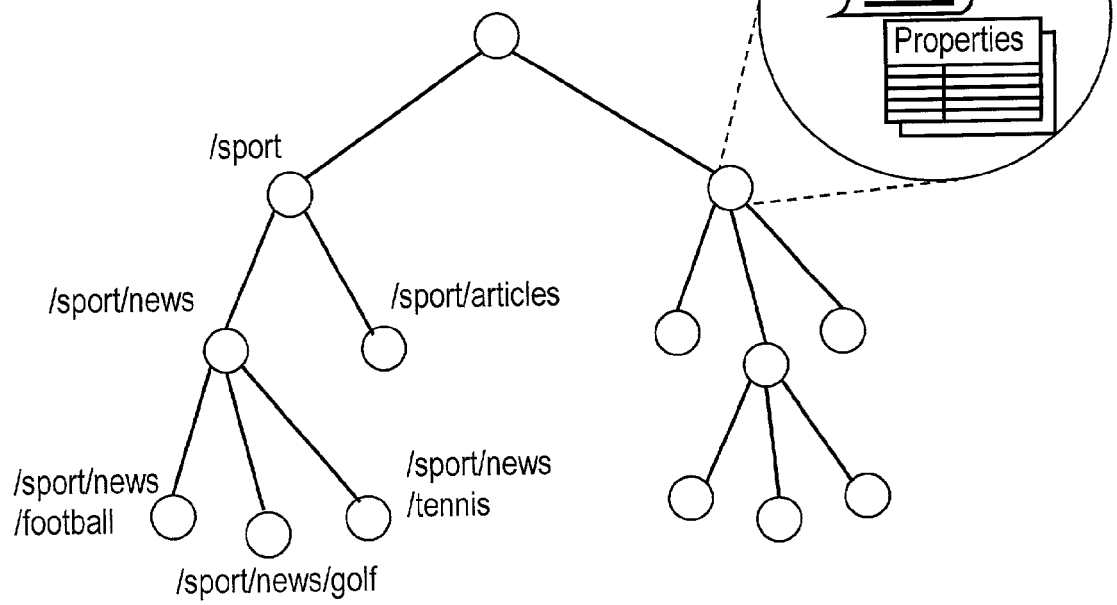
FIG. 2 shows the logical organisation of a content store.

Each object in the content store has a hierarchic address, which identifies its position in the tree structure. For example, FIG. 2 shows a portion of the content store, with objects identified by addresses such as "/sport/news/football". The root of the tree is indicated by "/". The objects directly below an object in the tree structure are referred to as its children; for example "/sport" has two children, "/sport/news" and "/sport/articles". Conversely, an object directly above another object in the tree is referred to as its parent; for example "/sport" is the parent of "/sport/news" and "/sport/articles".

Each object in the content store has an internal structure, comprising a content body and a number of properties. The properties may be further organised into one or more property sheets, so that name clashes between standard properties and those assigned by different groups of individuals are avoided. Property sheets provide a convenient visualisation of the concept of XML namespaces as used in WebDAV.

The properties of an object can be addressed by appending a suffix of the form :propertysheet:property to the object address. For example, /news/speeches/s1234:PUBLIC:speaker addresses the speaker property on the PUBLIC property sheet of the object at /news/speeches/s1234. If the property sheet is not specified, the PUBLIC property sheet is assumed by default.

An object can model any of the following items:

A simple file, where all the content is in the body, and is treated as just an unstructured row of bytes or text characters. There may be some fixed properties, such as content length and modification date, corresponding to those of an ordinary file.

A document together with its metadata, i.e. information about the document such as its author, approval status, subject matter, default publishing template and so on.

A fielded database record, where all the data is held in the properties, here having the role of database fields.

Combinations of the above, e.g. a fielded database record with associated metadata.

Temporal Versioning

Each object in the content store has a temporal version number associated with it. This may be explicitly assigned to it, as one of the object properties. The content store may thus contain several different versions of a given object with the same address but different version numbers. The version numbers may, for example, relate to different publication dates or development phases. Higher version numbers indicate later versions. A special marker object is used to indicate deleted content.

Any access to the content store access specifies an object address and a requested version number. The content store access service then accesses the content store to select the appropriate version, according to the following rules:

Read access. If an instance of the object with the requested version number exists, it is read. However, if it is marked as deleted, it is deemed not to exist. If an instance of the object with the requested version number does not exist, the most recent older version (i.e. with the highest version number not greater than the requested version number) is read.

Write access. If an instance of the object with the requested version number exists, then it is modified as requested. Otherwise, a copy is made of the most recent older version of the object, the copy is tagged with the requested version number, and the modifications are applied to this copy. The unmodified version is thus still available for viewing.

Deletion. A deletion marker object is created, and tagged with the requested version number. If an instance of the object already exists, with a version number exactly equal to the requested version number, that instance is deleted.

This means that a new system version can be created without making new copies of unchanged content: the previous versions will continue to be used in the new system version until they are modified. When an object is modified, a new copy is made automatically and transparently, and assigned the new version number, retaining the original unmodified version with the original version number. Likewise, if an object is deleted then it is merely marked as deleted at the new version number: the contents are retained in the content store labelled with the previous version number.

Within these simple rules, versioning can be used in a number of ways, for both long-term strategic site redesigns or campaigns, and day-to-day updates. A simple approach assigns two current versions: version N for "live" publishing (i.e. what site visitors see), and version N+1 for administering. This means that whatever site administrators do, their effects are not visible on the live sites. At some appropriate time, when the new material is complete and behaves correctly, both the live and administration versions are incremented, so the previous administration version becomes visible to visitors, and a new administration version is spawned. If necessary, the live site may be regressed back to its previous version. In addition, individual administrators may choose to view different system versions, and different sites may choose to publish from different system versions.

Figure 3:
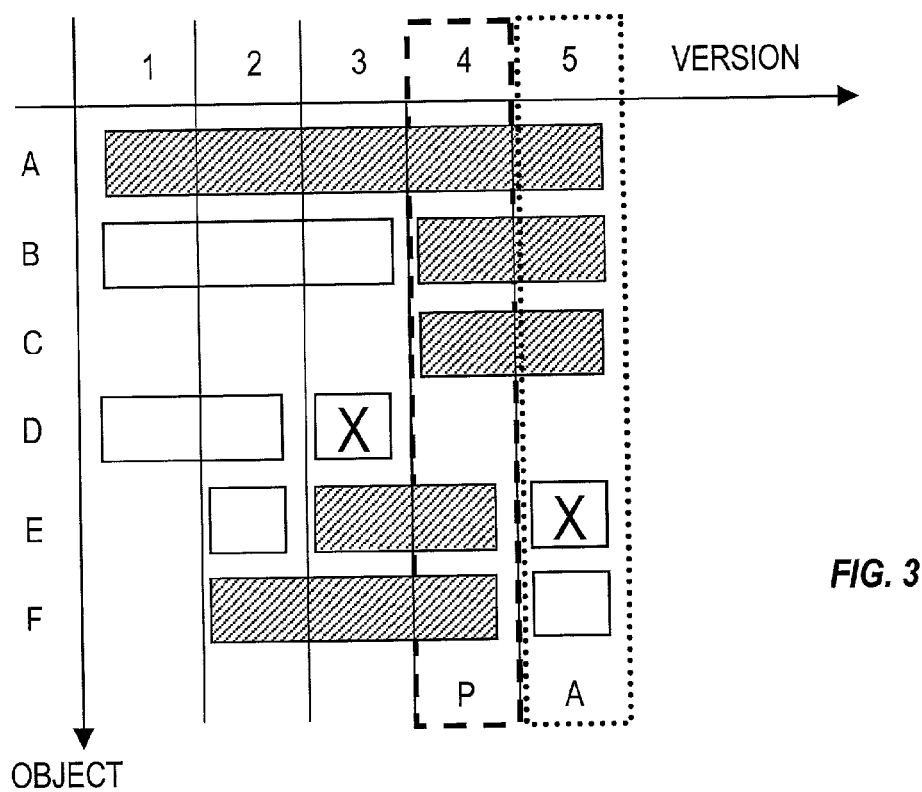
FIG. 3 illustrates temporal versioning in the content store.

An example of temporal versioning is shown in FIG. 3. In this, it is assumed that the live, published site (P) is always one version number behind the administration version (A). Currently live versions are shown shaded. It can be seen that:

The current live version of the site is version 4. This is what visitors see.

The current administration version of the site is version 5. This is what administrators see by default.

Object A has not changed since it was first published, so it continues to be published in its original form at version 4.

Object B has been modified at version 4. The previous version remains in case we need to regress the live site.

Object C is a brand new object at version 4. If we regressed the live site to version 3 it would seem to disappear.

Object D used to exist, but was deleted in a previous version, so it no longer appears in the live site. It would reappear if we regressed to version 2.

In the current administration site, objects A, B, C, and D remain unchanged, object E is deleted, and object F has been modified. These changes do not yet affect the live site.

Templates

A template consists of a document (typically HTML) containing embedded commands that identify what information is to be inserted into the template when it is rendered. These commands include WebDAV and other commands, embedded in the document using XML syntax. These embedded commands are distinguished from conventional HTML tags by a "ds:" namespace.

Templates may reside in file store, or may be held in the content store itself. Some examples of typical embedded commands that can be used in templates will now be described.

Insert Command

The insert command retrieves or constructs some text, and then inserts it into an output stream. One possible format for the insert command is:

<ds:insert content="SourceAddress" phase="phaseNumber" />

The SourceAddress attribute specifies the content store address of an object or property whose contents are to be retrieved and inserted into the output stream. For example, the command:

<ds:insert content="/sport/news/000216" /> retrieves the news article at address "/sport/news/000216" from the content store, and inserts it into the output stream.

The phaseNumber attribute specifies the expansion phase at which this particular command is to be performed. (See section below on multi-phase rendering). This attribute is optional; if omitted a default of zero is assumed.

Content properties can also be directly addressed, using the suffix notation mentioned above. For example:

<ds:insert content="/sport/news/000216:headline" /> inserts the headline property associated with the news article.

The content attribute may be replaced by a shortcut attribute. This indicates that the object referred to is a shortcut (see below), and in this case the value used will be the result of accessing the object as a shortcut.

Alternatively, the content attribute may be replaced by a src (source) attribute. This indicates a URL (Universal Resource Locator) which can be used to access an object from an external website.

For Command

The for command is used to specify an iterative loop through a set of objects or values, repeating some processing for each. One possible format for this command is:

<ds:for content="RootObject" filter="Filter" >
  Loop Body
</ds:for>

This command causes the enclosed Loop Body text to be repeated a number of times, once for each object in the RootObject folder.

The Filter attribute is an expression involving comparison operators, which specifies a condition for selecting objects from this set. For example, the expression:

subject EQ football OR subject EQ golf selects objects whose subject property is equal to either "football" or "golf".

The content attribute may be replaced by a shortcut attribute. This indicates that the object referred to is a shortcut (see below), and in this case the value used will be the result of accessing the object as a shortcut. If the shortcut has a filter property, this will be used as if it had been supplied as an attribute in the command.

The following is an example of the usage of the for command:

<ds:for content="/sport/news" filter="this:subject EQ 'football'">
  . . .
</ds:for>

This loops through all the articles in folder /sport/news, selecting only those whose subject property is equal to "football". This may be used, for example, to build an index page of news items relating to football.

A number of other "programming" commands (loops, conditions, procedures, variables etc.) are also provided, which may be used to produce very sophisticated and adaptive web pages.

Template Renderer

The template renderer 16 can be called (for example from the publishing application or from the administration interface), to render a specified template. The result is an output string, which is passed back to the caller.

A call to the template renderer contains the following arguments:

template The address in the content store of the template to be rendered.

expansionPhase The phase to which the template is to be rendered.

contentVersion The temporal version number to be used in the rendering process.

argString An optional string of arguments.

When called, the template renderer first accesses the content store to get the specified template. It then parses the template, to identify any embedded commands in it. When a command is identified, its phase is determined from its phase attribute; if there is no phase attribute, the phase is assumed to have the default value of zero. If the phase of the command is less than or equal to the expansionPhase argument specified by the call, the command is executed, and any text generated by the command is appended to the output string. If on the other hand the phase of the command is greater than the expansionPhase argument, the command is simply copied to the output string, (after expanding any expressions in the command). Similarly, any parts of the template that are not embedded commands are simply copied to the output string.

Multi-phase Rendering

The ability to specify phases in the embedded commands, as described above, allows templates to be rendered in multiple phases. For example, a first phase may be performed as part of a batch process to insert relatively static information into a template. The resulting partially-rendered template would then be stored in the content store. A second phase would then be performed at run-time, to insert dynamic information, such as information specific to the current user.

Figure 4:
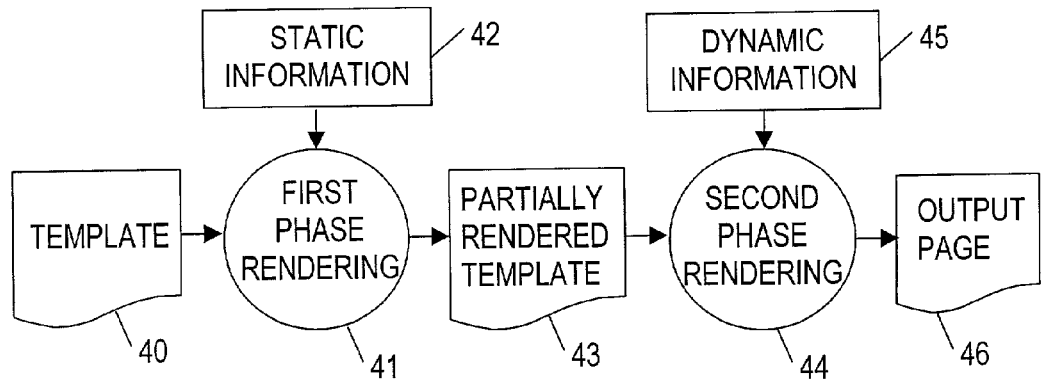
FIG. 4 illustrates the process of rendering a template in multiple phases.

FIG. 4 shows the process of rendering a template 40 in multiple phases (in this example, two phases). It is assumed that the template contains a number of embedded commands, and that some of these commands contain the attribute phase="0" (or implicitly have this phase value by default) while others contain the attribute phase="1".

In step 41, the template renderer is initially called with the expansionPhase argument set to 0. The template renderer will therefore execute all the embedded commands with phase="0", but will not execute the commands with phase="1". These commands may, for example, comprise insert commands, which insert relatively static information 42 from the content store. The result of this step is a partially rendered template 43, which still contains some embedded commands. This partially rendered template is saved in the content store.

In step 44, at run time the template renderer is called again, in response to a request from a client browser, to render the partially rendered template 43. This time the expansionPhase argument is set to 1. The template renderer will therefore now execute all the remaining embedded commands. These commands may, for example, comprise further insert commands, which insert dynamic information 45 from the content store. The result is an output page 46, which can then be returned to the client browser. The output page 46 may be in any text-based format such as HTML, XML, WML or ASCII, depending on the format of the original template.

If the content store is distributed, the output or source of the rendering process may be remote, and so the phases could be performed on different servers if required. For example, one batch server may feed several live websites. A "listener" feature is provided, whereby an application in a server can deduce whether something has changed, which can be used, for example, to trigger a rebuild or a cache flush.

Active Shortcuts

An active shortcut is an object whose body contains the address of another object (referred to as the target object). When the template renderer retrieves an active shortcut, it automatically accesses the content store again to retrieve the target object.

Active shortcuts may be used, for example, to allow an item of content to appear in many locations in the content store without needing separate copies. This is achieved by storing the item of content as a target object, referenced by a number of shortcuts. With this arrangement, if the target object is modified, the changes are immediately reflected in all the references (shortcuts) to it.

Because active shortcuts are objects in their own right, they may have properties, including filter properties. These properties override the properties of the target object. In particular, if the target object is a folder with a filter property, the shortcut may specify an alternative filter. Thus, it is possible to define a shortcut to a folder which references only items within the folder satisfying certain conditions, say only those news items about football.

Alternatively, the active shortcut may override a template property of the target object, so that the object looks different when viewed through the shortcut.

Declarative Modelling

In general, the structure of a website will reflect that of the underlying raw content store. However, this may not always be appropriate. For example, the raw content might need to be organised according to physical location (if it is distributed), or ownership. Furthermore, the content may be required to populate multiple websites of different structures and with different selections in each. Keeping multiple copies of content would consume space and incur an administrative and performance overhead to keep them in step.

To solve this kind of problem we can use active shortcuts to build alternative views on the same set of raw content. This is referred to herein as declarative modelling. The advantage of such a model is that symbolic operations on the model automatically result in operations in the real world. For example, copying and pasting a shortcut into one or more models causes the referenced content items to be published in the corresponding websites.

Figure 5:
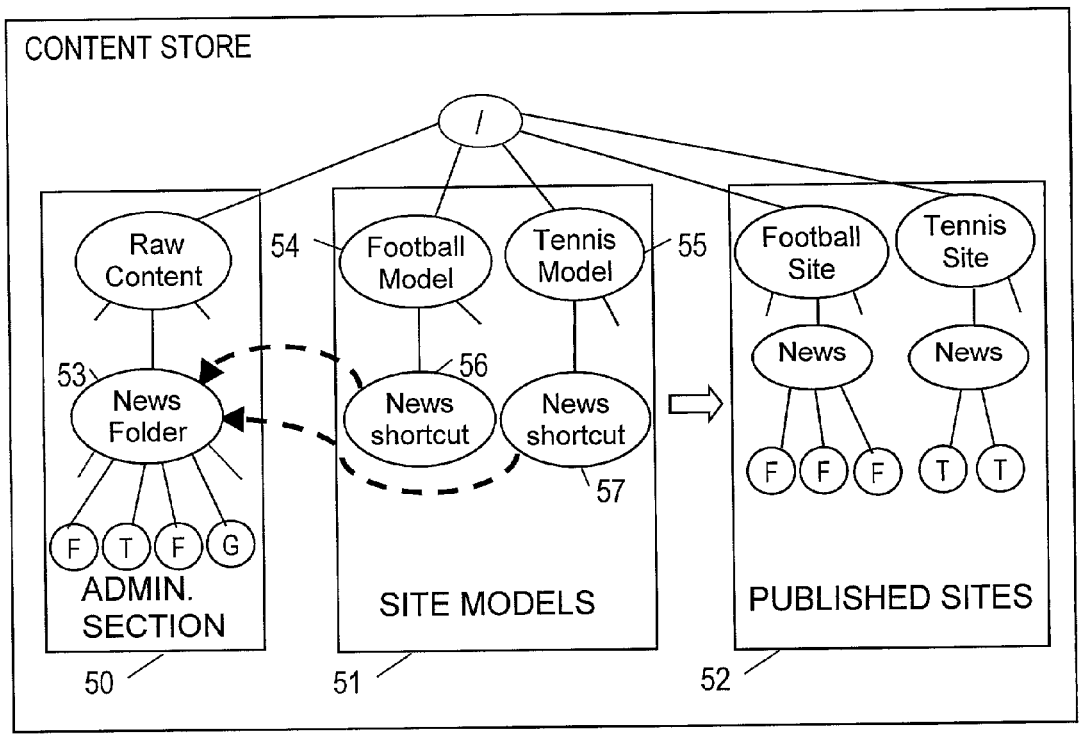
FIG. 5 illustrates the use of active shortcuts to model different websites using the same raw content.

An example of the use of active shortcuts for declarative modelling is illustrated in FIG. 5. In this example, the content store is divided into three sections 50–52, reflected by branches or groups of branches in the content tree. The first section 50 contains raw content for use in all sites. The second section 51 contains models of the target sites. The third section 52 contains published sites themselves.

The raw content 50 is arranged for administrative convenience. Here, all news items have been grouped into a single folder 53. "F" denotes items about football, "T" about tennis, and "G" about golf.

The site models 51 contain appropriate folder structures, templates, brand images, and anything else that might be site-specific. Here we have defined two sites 54,55; one about football, the other about tennis. In most cases, actual content in these sites is replaced by shortcuts to items in the raw content store. Here we have included shortcuts 56,57 to the news folder 53, with different filters so that the two sites include only appropriate articles.

When publishing occurs, the shortcuts are followed to retrieve the raw content, and to generate the target site 52. The properties defined in the shortcuts are used to apply content filtering, template selection, and other customisations specific to the target sites. For static publishing, the whole of the target site is generated in advance and stored. For dynamic publishing, the target site 52 is a virtual site, the component pages of the target site being generated on demand.

Note that adding a news item to the raw content folder 53 will automatically add the news item to any site to which it is relevant.

Modelling Complex Pages

In some cases, complex pages such as portals may also benefit from declarative modelling. In this case, instead of a page being represented by a single object or template, the page is described by a subtree of resources, each representing some page component such as a featured news article or site index. Shortcuts are used so that components of the page can be changed just by redirecting the shortcut, without needing to change the page itself or to write any new HTML.

Figure 6:
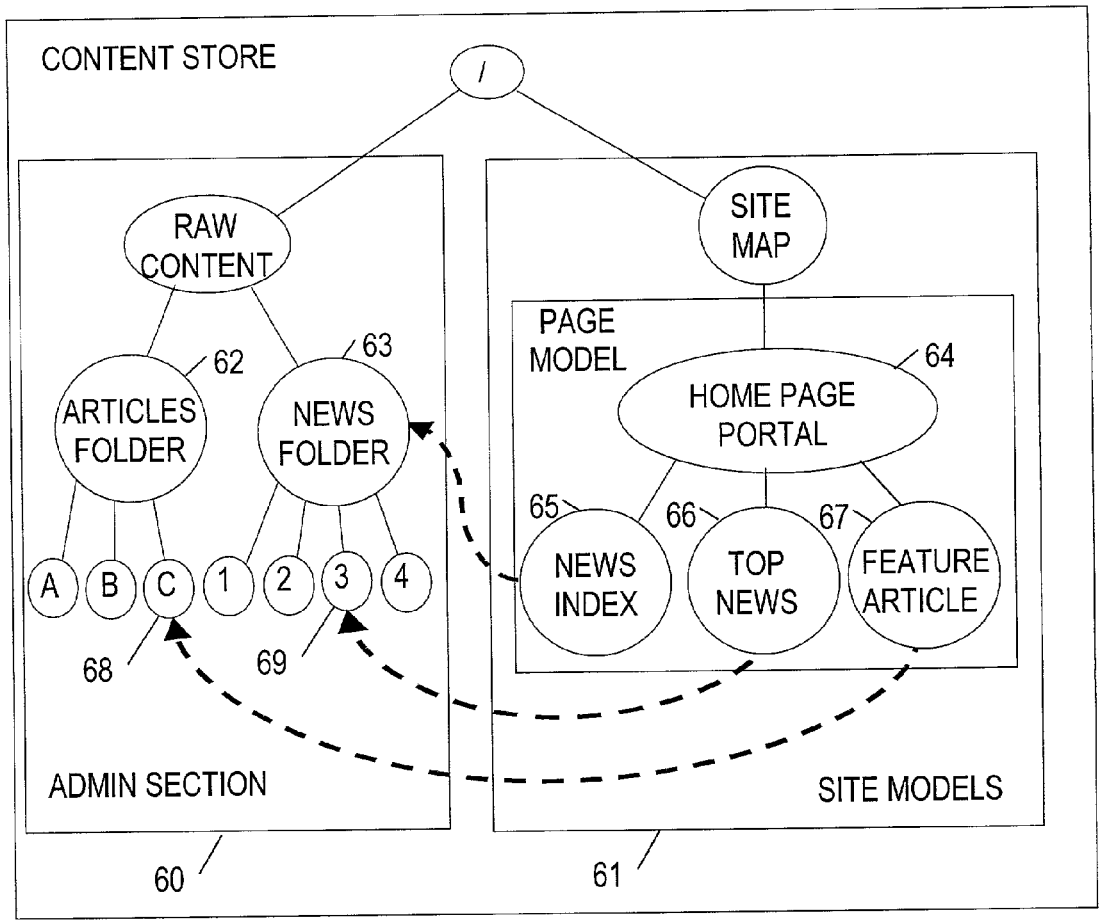
FIGS. 6 and 7 illustrate the use of active shortcuts to model complex pages.

An example of this is illustrated in FIG. 6. In this example, the content store is divided into sections 60,61; one for the raw content and one for the target site models. Raw content is organised for administrative convenience. Here we have two folders 62,63; one for editorial articles and one for news items.

Site models are defined as before, but here the internal structure of the portal page has also been exposed. That is, the portal page is modelled by a folder 64, which contains shortcuts 65–67 representing components of the published page. The shortcuts point to objects in the raw content section 60; in this example, the shortcuts 65–67 point respectively to the news folder 63, a news item 69, and an article 68. The portal template may also generate indexes for folder shortcuts, and summaries for resource shortcuts.

Figure 7:
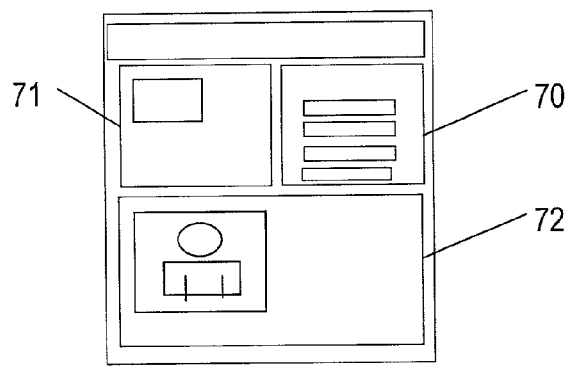

When the site is published, the shortcuts 65–67 are followed to build the portal page. FIG. 7 shows the resulting page. This consists of three panes 70–72, which respectively display a news index, the news item 69, and the feature article 68, obtained through the shortcuts 65–67.

Re-routing any shortcut will cause the associated component of the portal to be updated. Similarly, adding or removing items to or from a folder will automatically alter any indexes.

Administration Interface

The administration interface 15 allows content to be browsed, copied, moved, tagged and similarly managed. It also provides a launchpad for other management functions, such as import/export and publishing.

The interface displays a screen containing two panels. The left panel is a conventional folding-tree view of the content store. It shows content down to the folder level. Folders may be expanded by clicking on a "+" icon, or selected by clicking on their icons.

The right panel shows details of the folder currently selected in the tree view. Resources (objects) within the selected folder may be selected by clicking on their icons. Tabs are provided to allow viewing of one or more properties sheets and a content sheet for the selected object.

The interface also provides a toolbar, which allows miscellaneous operations to be performed on the selected object. Standard operations include "cut", "copy", "paste", "preview", "select all", "import/export" etc.

Resource Schema

Some of the objects held in the content store are class objects, which define a set of classes for other objects in the store. The set of available classes is collectively known as a resource schema. As will be described, when creating a new object, a user can specify a class for that object, and the new object will then automatically take on the properties of that class.

An important feature of the schema is that it is represented as ordinary objects, and so all the ordinary content operations can apply to it. In particular, it can be accessed and modified by any of the normal methods (WebDAV, the User Interface, templates etc.), can be imported/exported as XML, can have versioning and access control applied, and so on. Furthermore, if an administrator does not have access permission to an object that happens to be part of a schema and describes some property in an object instance, then the administrator will not be able to see the property in HTML forms when he or she updates object instances.

Figure 8:
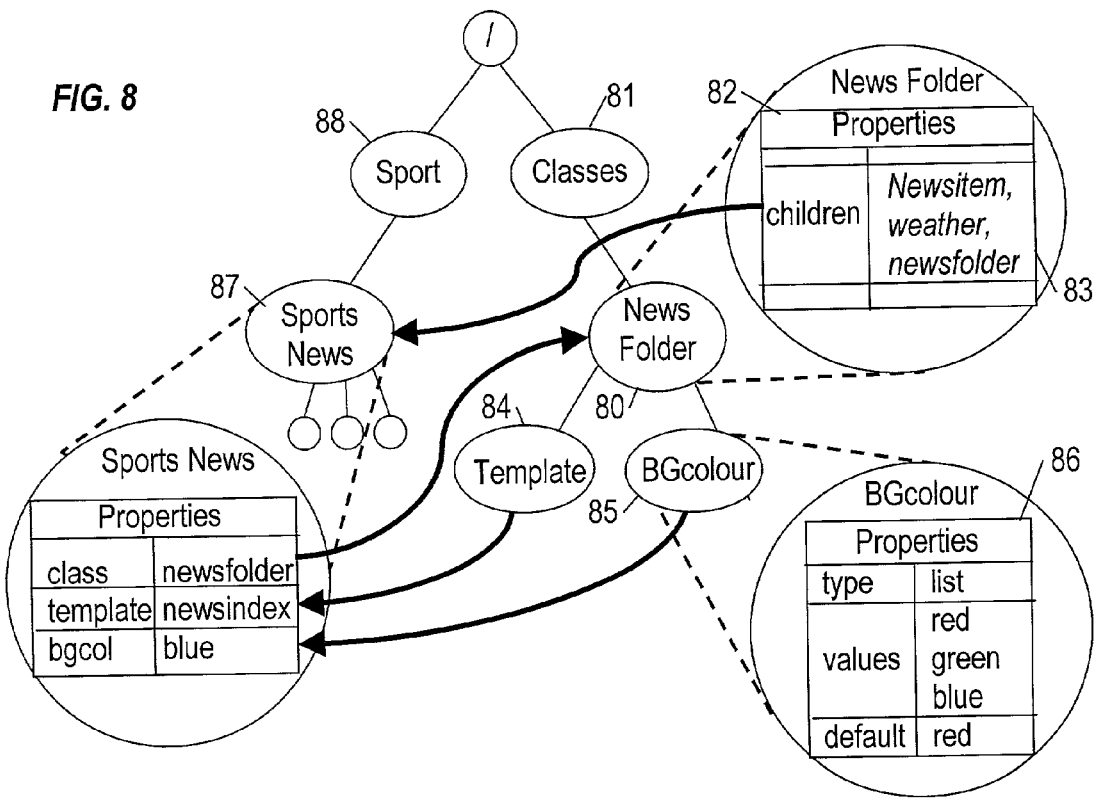
FIG. 8 shows an example of a resource schema.

FIG. 8 shows an example of a resource schema. In this example, the schema includes a "News Folder" class object 80, which describes the attributes of News Folder objects. As shown, the News Folder class object resides in a special "Classes" directory 81 in the tree structure. This directory may also contain other class objects (not shown).

The News Folder class object 80 has a set of properties 82, which define attribute values shared by all members of this class. In particular, one property 83 defines what types of child object a News Folder object may have. In this example, a News Folder object may have children of the following three classes:
news items,
weather reports, and
other news folders for substructuring.

A class object may itself have a number of child objects, which represent resources owned by the class. In this example, the News Folder class object 80 has two child objects: a template object 84, used to display the list of news items, and a BGcolor (background color) object 85, for use in the template. The BGcolor object has a set of properties, including a set of permitted background colors that can be used in the template: in this case red, blue or green. Another property of the BGcolor object specifies the default color: in this case, red.

FIG. 8 also shows a "Sports News" directory object 87, which resides in a "Sports" directory 88. The Sports News directory is assumed to be a member of the News Folder class, as defined by the News Folder class object 80, and so inherits the properties of that class. In particular, it uses the template object 84 as its default template for generating web pages, and uses the BGcolor object 85 to specify its background colors.

Creating a New Object

When a user desires to create a new object in the content store, the user first uses the administration interface 15 to select an existing object that is to be the parent of the new object. The administration interface toolbar includes a "Create new object" option. If this option is selected, the administration interface automatically accesses the class object corresponding to the selected object, to find the permitted classes of child object for the selected object. A drop-down menu is displayed, listing these permitted classes.

If the user selects one of these permitted classes, the administration interface then automatically creates a new object of the selected class, giving it the properties of that class as specified by the class object for that class. The user can then edit the new object, if desired, for example by inserting text or other content into it.

For example, referring to FIG. 8, if the user wishes to create a new object in the Sports News directory, the user first selects this directory and then clicks on the "Create new object" option. The administration interface will then access the News Folder class object 80, and display a drop-down menu containing a list of the permitted child objects for this class: namely News Item, Weather Report and News Folder. The user can then select one of these (say News Item), and the administration interface will then automatically create a new object of this class.

Some Possible Modifications

It will be appreciated that many modifications may be made to the system described above without departing from the scope of the present invention.

For example, while the example described above is concerned with generating web pages, it will be appreciated that it could also be used in for generating other types of document, for example in non-web applications such as paper publishing and "digital dashboards".

Also, while the above example describes two-phase rendering of a template, it will be appreciated that, if required, a template may be rendered in more than two phases.

What is claimed is:

1. A computerized method for generating a webpage, the method comprising:
(a) storing a plurality of objects, including content objects and shortcut objects, wherein said content objects contain information for inclusion in the webpage and wherein each of said shortcut objects contains a target address referencing one of the content objects,
(b) providing a template including a plurality of commands for inserting content into the webpage, each command including a source address referencing one of said objects,
(c) parsing the template to identify the commands,
(d) executing each command by accessing the object referenced byte source address within the command,
(e) if the object referenced by the source address is a content object, inserting information from the content object into the webpage, and
(f) if the object referenced by the source address is a shortcut object, accessing the content object referenced by the target address in the shortcut object, and then inserting information from the content object into the webpage.

2. A method according to claim 1, further including:
(a) assigning property values to said content objects and shortcut objects, and
(b) causing the property values of a shortcut object to override corresponding property values of the content object reference by the shortcut object.

3. A web server computer system comprising:
(a) means fir storing a plurality of objects including content objects and shortcut objects, wherein said canton objects contain information for inclusion in a webpage and wherein each of said shortcut objects contains a target address referencing one of to content objects,
(b) means for storing a template including a plurality of commands for inserting content into the webpage, each command including a source address referencing one of said objects, and
(c) executing means for executing each command by accessing the object referenced by the source address within the command,
(d) wherein, if the object referenced by the source address is a content object, said executing means inserts information from the content object into the webpage, and (e) and wherein, if the object referenced by the source address is a shortcut object, said executing means accesses the content object referenced by the target address in the shortcut object and then inserts information from the content object into the webpage.

4. A system according to claim 3, further including:
   (a) means for assigning property values to said content objects and shortcut objects, and
   (b) means for causing the property values of a shortcut object to override corresponding property values of the content object referenced by the shortcut object.

5. A computer program product comprising machine readable medium including a computer program for performing a method for generating a webpage, the method comprising:
   (a) storing a plurality of objects, including content objects and shortcut objects, wherein said content objects contain information for inclusion in the webpage and wherein each of said shortcut objects contains a target address referencing one of the content objects,
   (b) accessing a template including a plurality of commands for inserting content into the webpage, each command including a source address referencing one of said objects,
   (c) parsing the template to identify the commands,
   (d) executing each command by accessing the object referenced by the source address within the command,
   (e) if the object referenced by the source address is a content object, inserting information from the content object into the webpage, and
   (f) if the object referenced by the source address is a shortcut object, accessing the content object referenced by the target address in the shortcut object, and then inserting information from the content object into the webpage.

6. A computer program product according to claim 5, wherein said method further includes:
   (a) assigning property values to said content objects and shortcut objects, and
   (b) casing the property values of a shortcut object to override corresponding property values of the content object referenced by the shortcut object.

* * * * *